United States Patent [19]

Bouchet et al.

[11] Patent Number: 4,850,742

[45] Date of Patent: Jul. 25, 1989

[54] METHOD AND DEVICE FOR ATTENUATING THE SEA SWELL

[75] Inventors: René Bouchet; Jean M. Manzone, both of Monaco, France

[73] Assignee: Gouvernement Monegasque, Le Service des Travaus, Monaco, France

[21] Appl. No.: 74,486

[22] PCT Filed: Oct. 3, 1986

[86] PCT No.: PCT/MC86/00003

§ 371 Date: Aug. 13, 1987

§ 102(e) Date: Aug. 13, 1987

[87] PCT Pub. No.: WO87/02724

PCT Pub. Date: May 7, 1987

[30] Foreign Application Priority Data

Oct. 23, 1985 [FR] France ............... 85 15938

[51] Int. Cl.[4] ............................. E02B 3/06
[52] U.S. Cl. ........................ 405/26; 405/30
[58] Field of Search ............... 405/15, 21, 23, 25, 405/26, 27, 28, 30, 31, 34, 35

[56] References Cited

U.S. PATENT DOCUMENTS 3,490,239 1/1970 Vincent ................... 405/31
3,538,710 11/1970 Tourmen ................. 405/31
3,851,476 12/1974 Edwards ................ 405/28 X Primary Examiner—David H. Corbin
Attorney, Agent, or Firm—Marshall & Melhorn

[57] ABSTRACT

A breakwater for attenuating the sea-swell effects of waves includes a bottom plate rigidly supporting and adapted to be immersed in a body of water. A generally upwardly extending solid front wall is formed at an upstream edge of the plate and an upper end of the front wall extends above the surface of the body of water. A generally upwardly extending rear wall is formed at a downstream edge of the bottom plate and has a plurality of regularly spaced orifices formed therein. A generally upwardly extending intermediate wall is formed between the front wall and the rear wall and also includes orifices, the front wall and the intermediate wall forming therebetween an energy dissipation basin. The front wall extends above the surface of the body of water so as to prevent the passage of a sea swell above the bottom plate as long as the amplitude of the swell is average. The water between the bottom plate and the bottom surface of the body of water behaves like an inert obstacle whereby at least a portion of an incident sea swell is reflected and any swell wave transmitted downstream is of reduced amplitude.

19 Claims, 5 Drawing Sheets

METHOD AND DEVICE FOR ATTENUATING THE SEA SWELL

It is known that very numerous sectors of activity depending on the industry of the sea would draw considerable profit from the existence of a swell attenuator device which is of inexpensive construction, requiring only minimum maintenance, resistant to bad weather, not hindering navigation of boats of low tonnage, and repecting the aesthetics of a site and the integrity of the marine environment.

Among the possible applications of such a device, the following may be mentioned by way of non-limiting examples:

- the reduction of the lapping of waves in harbours and natural shelters,
- the creation of artificial harbours and the protection of the port installations already existing and likely to give signals of fatigue,
- the creation and protection of offshore installations (platforms of all types, dykes, breakwaters and immersed storage tanks, etc. . . .),
- improvement of the safety of sea operations (hauling of structures, assembling of prefabricated elements, recovery of layers of hydrocarbon, etc. . . .) and even possibly,
- the recovery of the energy of the waves and swell.

A large number of devices tending to produce effects of this type has already been proposed. In particular, a virtually exhaustive review of the studies already made on this subject is to be found in Report R 727 published in May 1971 by the Marine Department of the United States of America.

However, the heretofore proposed devices call upon material elements which generally employ vertical obstacles or damping effects of viscous orgin. Now, the swell being an undulatory phenomenon, it would appear more promising to exploit, in order to envisage attenuation thereof, means resulting from conventional mathematical calculations intervening in these undulatory phenomena.

A first attempt was made in this direction, and formed the subject matter of a first Patent by the Applicants, precisely envisaging a completely novel type of method, designed from the notion of a phenomenon identified under the name of "oscillating wall of water" and of which the creation, based on theoretical calculations of undulatory phenomena of this type, already made it possible to obtain in practice the desired results by means of material elements which are unquestionably simple, inexpensive and of small size.

To that end, this prior method consisted in creating, from the incident swell, a phenomenon likewise of undulatory nature, materializing in the form of an "oscillating wall of water" generating a system of waves of radiations of which the composition with the diffracted wave present downstream of said "oscillating wall of water", gave a resultant which was zero or of low amplitude.

From the practical standpoint, the means proposed for carrying out this method consisted of a parallelepipedic caisson, disposed at a certain depth perpendicularly to the incident swell and having a mass such that it enters into oscillation with an amplitude and a phase provoking cancellation or considerable reduction of the diffracted wave, present downstream of said caisson, and this for a wide range of periods of the incident swell, this caisson being able to be constituted by a simple envelope filled with the water of the enviornment, and whose dimensions are such that said mass of the caisson is equal to the mass of the volume of water displaced and said envelope is subjected only to vertical efforts, and even not to possess lateral walls, with the result that, finally, said "oscillating wall of water" is obtained by immersion of at least one slab of small thickness with respect to its other dimensions, at a distance from the sea-bed such that the mass of water located between said plate and the sea-bed is equal to said mass of the caisson and said slab is subjected only to vertical efforts.

The drawback of this solution contained in its very principle is of not really attenuating the phenomenon of swell downstream of the device, but only of composing it with a phenomenon also produced downstream of said device, with the result that the obtaining of a zero or low-amplitude resultant was dependent on certain factors which, if they were not respected, risked rendering the device inoperative.

The present invention aims at overcoming this drawback thanks to a method in which the effects of attenuation of the swell are created no longer downstream but upstream of the means employed, with the result that the swell wave transmitted downstream is in any case of reduced amplitude.

In other words, instead of an "oscillating wall of water" creating downstream of the device a wave of radiation being composed with the diffracted wave to give an attenuated or zero resultant, the method according to the invention employs a "fixed wall of water", creating, upstream of the device, a reflected wave being composed with the incident wave to give an attenuated or zero resultant downstream.

To this end, the method according to the invention consists in immersing in the incident swell a plate maintained fixed, and of which the upstream and downstream edges are turned back perpendicularly up to a positive dimension above the free surface so that the incident swell cannot propagate freely above the plate, with the result that the mass of water imprisoned beneath the plate can have only horizontal displacements, and it behaves overall like an inert obstacle with respect to the incident swell, the latter being reflected on this "fixed wall of water" and this all the more so as its energy (or period) is weaker.

From the practical standpoint, the upstream edge raised perpendicularly to the immersed plate is made level with a dimension able to be passed over by the average and strong swells of the site in question and the downstream edge, raised perpendicularly to the immersed plate is pierced with regularly spaced apart orifices, with the result that, when an average or strong swell passes over the upstream edge, it loses an appreciable part of its energy by dropping on the damper mattress constituted by the water imprisoned in the volume included between the lower plate and the upstream and downstream edges, whilst the excess height of water created momentarily in this volume is evacuated through said orifices made in the downstream edge.

According to a variant embodiment, said upstream edge is provided with a bulb-shaped contour up to its level dimension, so as to limit the shocks and corresponding horizontal efforts to values lower than those which would be generated on an edge with flat surface perpendicular to the plane of propagation of the incident swell.

According to another variant embodiment, said upstream edge is constituted by a fixed part made level with a slightly positive dimension and surmounted by a mechanical device which extends a mobile shutter with the aid of a hydraulic jack or a compressed air volume, with the result that the height of the upstream edge, above the free surface of the water, may be adjusted to different levels as a function of the amplitude of the incident swell or as a function of the height of the free surface of the water defined by the tide, or may be reduced if the horizontal efforts generated by the incident swell on the device became too great.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

Figure 1:
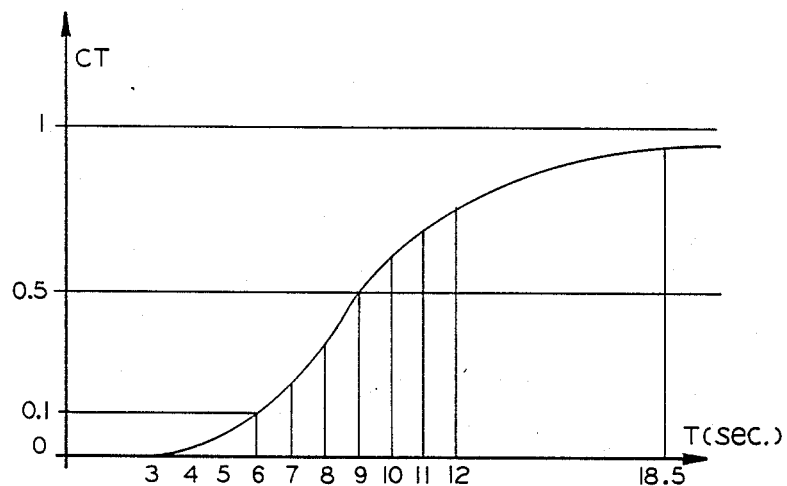
FIG. 1 is a graph of the coefficient of transmission plotted against the period in seconds of a sea swell.

The physical bases of the invention will now be set forth, with reference to the theoretical elementary case of a swell propagating in a canal of uniform depth.

If a vertical wall is interposed at a point of the canal, it is known that the swell will be entirely reflected on this wall.

At a given point, the incident swell wave may be characterized by an excess height h (x,t) of the stretch of water (initially at rest) and a horizontal velocity U (x,t) along the axis of propagation, which is the projection on this axis of the velocity of the molecules of water (which in fact, as is known, described circles).

The fact of interposing a wall at a point of the path imposes that U (x,t)=O after the wall, i.e. that the horizontal velocity changes direction and it is known that, in that case, the incident swell wave is entirely reflected.

It may therefore be considered that if, instead of interposing a wall, a device is interposed which imposes a reduction in the horizontal velocity of the molecules of water, a partial reflection of the swell wave will be had and this reflection will be better as the reduction in velocity imposed is greater.

If a plate is then considered, of appreciable length with respect to the wave length and slightly immerged in the canal, and of which the edges are raised perpendicularly up to a positive dimension above the free surface so as to avoid any passage of the swell above the plate, at least as long as the amplitude of said swell remains reasonable, the water which is imprisoned between the plate and the bottom of the canal can have only a horizontal movement, i.e. the velocity of the corresponding molecules of water can only be horizontal.

A given swell possesses a certain energy which is propagated via the pressure, when this swell strikes the mass of water included between the plate and the bottom, it communicates thereto an overpressure. This overpressure, applied to the inlet face of the mass of water will communicate thereto an acceleration and therefore a velocity. The value of this velocity will depend on the size of the "braking" mass of water and on the energy brought by the incident swell (pressure on the inlet face of the captive water mass).

It may therefore be considered that, for a given swell, therefore of given energy, a width of plate may always be found which makes it possible to imprison a sufficient mass of water for the velocity communicated to this captive water mass to be sufficiently low and therefore the incident swell wave to be virtually reflected at the inlet of the device.

Reciprocally, for a given device, i.e. for a fixed plate width, the energy brought by the swell (the pressure which will be exerted on the inlet face of the device) will depend on the period of this incident swell since the swells of low periods are not very energetic whilst the swells of high periods are more energetic. In this way, it may be provided that the swells of low periods will be considerably reflected whilst the swells of high periods will be virtually transmitted.

Such a device will therefore behave like a swell attenuator which is of greater performance as the periods of the incident swells are low.

This interpretation is confirmed by the mathematical calculation which, applied to a slab 25 m long immersed 4 m deep on a bottom of 44 m behaves like a wall entirely reflecting the incident swell for the low periods (up to 5.0 seconds) and an excellent swell attenuator for higher periods, going up to 9 or 10 seconds. In this way, for a swell of 7 seconds period, the coefficient of transmission is still only 0.23, i.e. 95% of the energy of the incident swell is reflected.

This is what is expressed by the graphs of FIGS. 1 and 2 which respectively represent the theoretical variations of the coefficient of transmission CT and of the phase-shift of the swell as a function of its period T (sec.) with a device as defined hereinabove.

These theoretical considerations have been confirmed by experiments.

Figure 3:
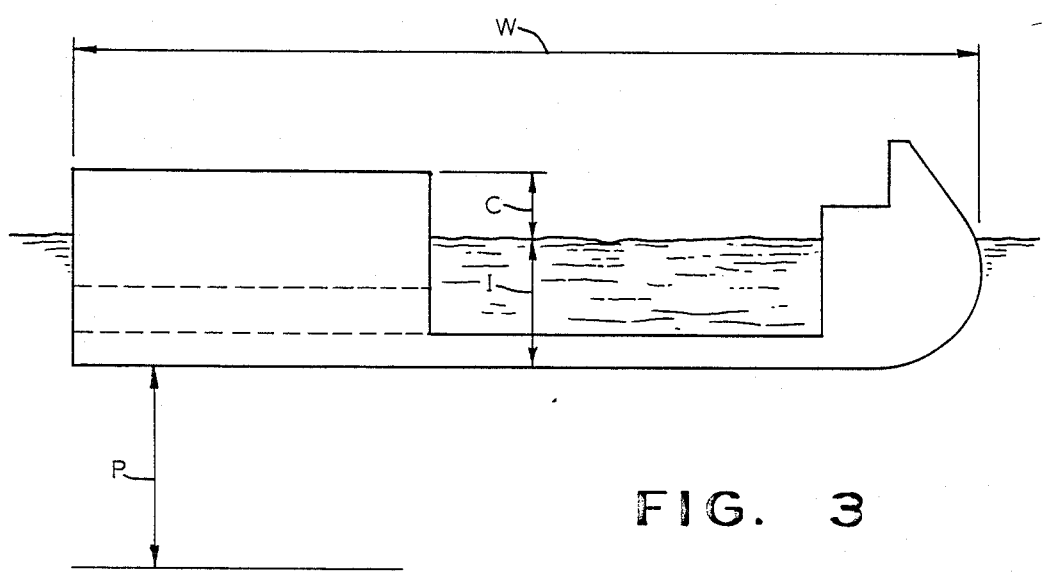
FIG. 3 is side elevational view of a model breakwater in accordance with the present invention.

Such an experimental study was made on reduced models of breakwaters of which the transverse section is given in FIG. 3, of width W, immersed at depth I and spaced above a bottom surface a distance P, and projecting beyond the free surface by a positive dimension C.

Among the numerous configurations examined, the following may be mentioned:

plate 16 m wide, immersed at −2 m. Height of water 22 m. Periods tested: 4, 5, 6, 7 and 8 seconds. Two amplitudes per period. Scale 1/20.

plate 18 m wide, immersed at −4 m. Height of water 44 m. Periods of 6, 7, 8, 9, 10, 12, 18 seconds. One or two amplitudes per period. Scale 1/40.

plate 25 m wide immersed at −4 m. Height of water 44 m. Periods of 5.2, 6, 7, 8, 9, 10, 12, 18 seconds. One or two amplitudes per period. Scale 1/40.

plate 25 m wide immersed at −5 m. Height of water 44 m. Periods of 6, 7, 8, 9, 10 seconds. One amplituds per period.

The coefficients of transmission were measured and in numerous cases, a Fourier analysis was made in order to distinguish what depended on the period during examination from what depended on the different harmonics.

Measurements of efforts were made, in addition, on the plate of 25 m.

The object being to limit to a maximum the horizontal efforts, the upstream deflector received a circular form and the smallest possible level dimension was sought. Level dimensions of +1.50, +2, +3 were thus tested, both from the standpoint of hydraulics and of the efforts recorded.

The dimension of immersion depends on the amplitude of the maximum swells capable of reaching the work.

The energy dissipation basin located downstream of this deflector was placed in communication with downstream.

The downstream threshold, at dimension +2, was provided to be sufficiently wide to allow use thereof as path- or trafficway. It may obviously be easy of access.

From the hydraulic standpoint, the results obtained are still clearly more favourable than those resulting from the conventional theories (Macagno, Wiegel, etc. . .), which confirms the determining importance of the ratio: L/W: wave length of the swell in infinite depth, over width of the plate.

Figure 4:
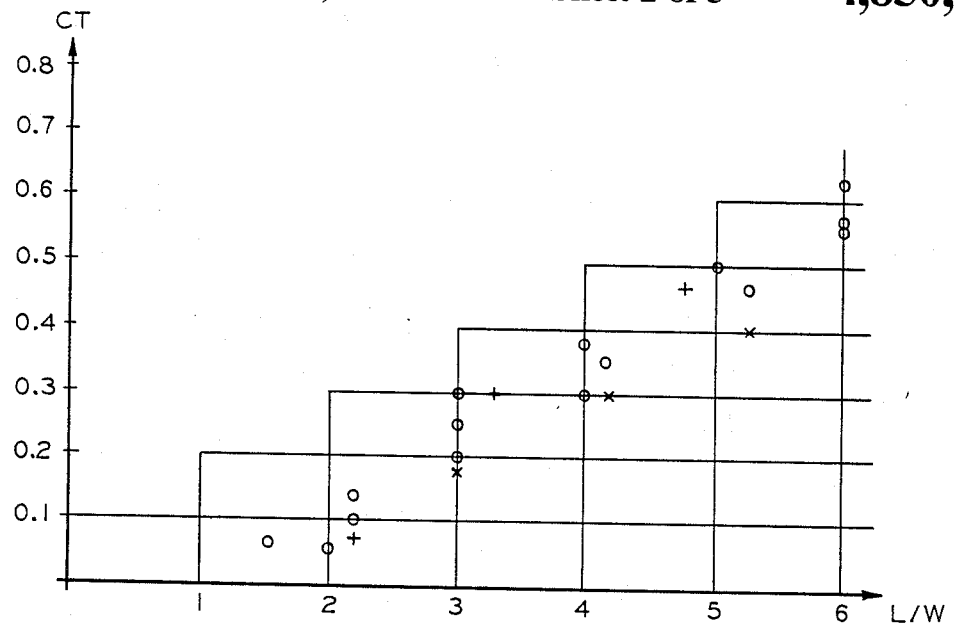
FIG. 4 is a graph of the coefficient of transmission plotted against the ratio of the length of the swell to the width of the breakwater for a large number of tests of the present invention.

Thus, the graph of FIG. 4 shows the different values of the coefficient of transmission as a function of the ratio L/W, whilst the depths of water, the immersions and the cambers varied, combined in the course of a large number of tests.

It has been seen hereinabove, in the theoretical part, that the amplitude of the horizontal oscillations of the mass of water under the plate was a function of L/W. Below a certain period, the velocity of the particles of water changes direction before the displacement becomes considerable, so that the kinetic energy cannot transform into potential energy.

This is what the experiments have demonstrated. For a plate of 25 m wide and periods less than 5.5 seconds, the amplitudes of the horizontal displacement are negligible.

For a swell of 6 seconds and of 3.70 m amplitude, the horizontal oscillations are only about 0.60 m. They attain about 2.40 m for swells of 8 seconds and 7 m amplitude.

Figure 5:
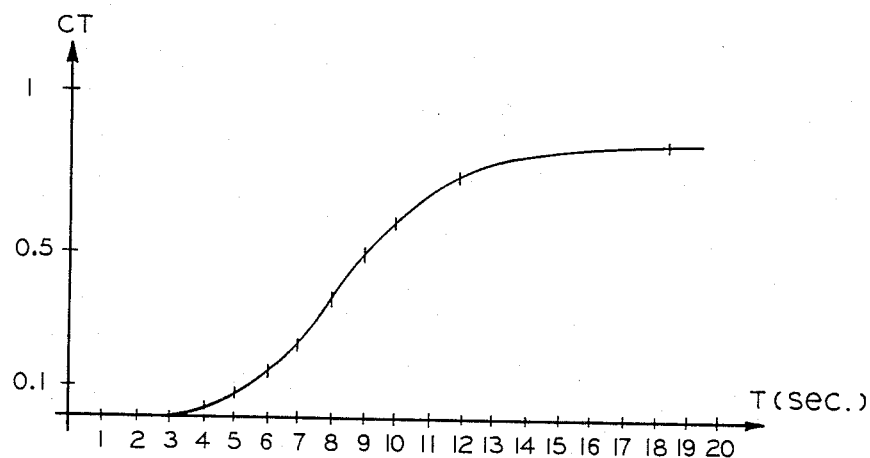
FIG. 5 is a graph of the coefficient of transmission plotted against the period for a breakwater of predetermined width.

The graph of FIG. 5 shows the variations of the coefficient of transmission as a function of the period in the above configuration.

Figure 2:
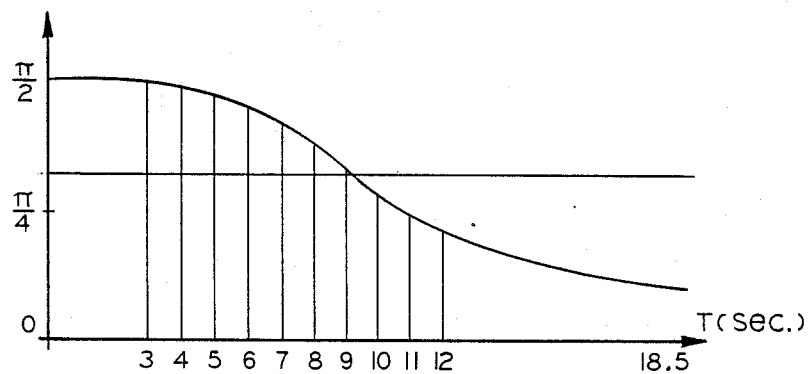
FIG. 2 is a graph of the phase shift plotted against the period in seconds of a sea swell.

An excellent concordance is noted between the graph obtained experimentally and the theoretical graph given previously in FIG. 1 for periods included between 0 and 10 seconds. Beyond 10 seconds, the theoretical graph gives coefficients of transmission slightly greater than those obtained experimentally.

This doubtlessly comes from the fact that, in the application of the Newton formula which gives the theoretical values of the coefficient of transmission, the forces of friction have been neglected; the latter, proportional to the velocity, perform a more important role for the high periods for which the velocities under the plate are higher.

Up to 5.0 seconds (period corresponding to a value of L/W of 2), the mass of water located beneath the plate remains virtually immobile. It behaves like a fixed vertical wall and the swell is totally reflected, hence the name of "fixed wall of water" given to the method.

From 6 seconds, period corresponding to a value of L/W of 2.2, the mass of water begins to oscillate but the transmitted swell remains, within a wide range, much less than the incident swell. A phase shift is noted between the movements of the incident swell and of the "wall of water".

The coefficient of transmission then increases, in virtually linear manner, at least up to values of L/W of the order of 5. It is the lower as the immersion of the plate is great. The other factors: camber of the swell, relative depth (depth of water over wave length of the incident swell) appear to perform only secondary roles. The camber would reduce the coefficient of transmission up to values of L/W of about 5, increasing it beyond.

Figure 6:
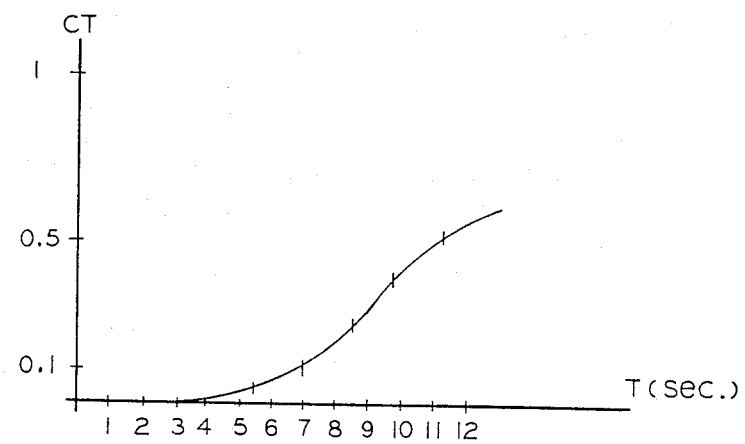
FIG. 6 is a graph of the coefficient of transmission plotted against the period for a two plate breakwater configuration.

The coefficient of transmission may be further reduced by increasing the frictions and by improving the homogeneity and the "solidity" of the wall of water, which may be done by disposing a second plate of the same width under the first. The graph of FIG. 6 shows the variations of the coefficient of transmission of an assembly of 2 plates 32 m wide placed, one at −6 m, with a deflector at +3 m, the other −14 m.

As to the relative depth, it must be recalled that the domain of use of the method is that of considerable depths. During the tests, the ratio: depth over wave length has only exceptionally been less than ¼, so that the swells were only slightly deformed.

Figure 7:
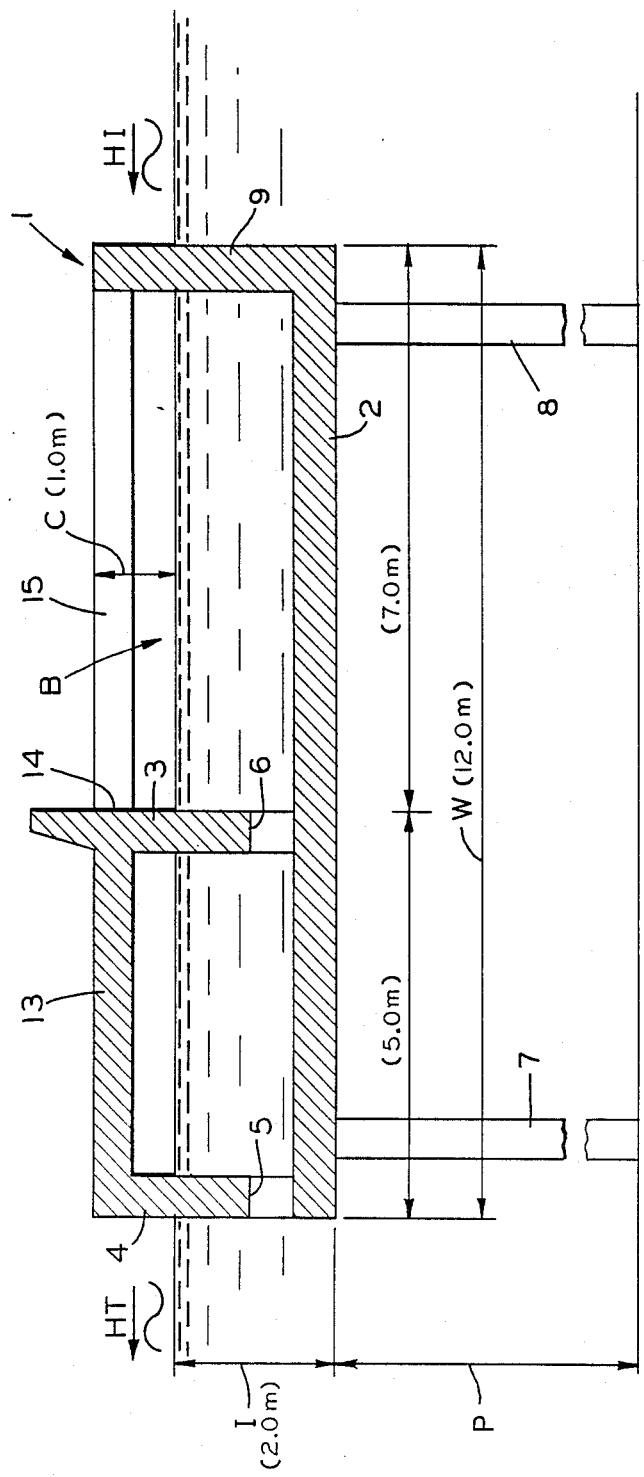
FIG. 7 is a side elevational view of a breakwater according to the present invention in cross-section.
Figure 8:
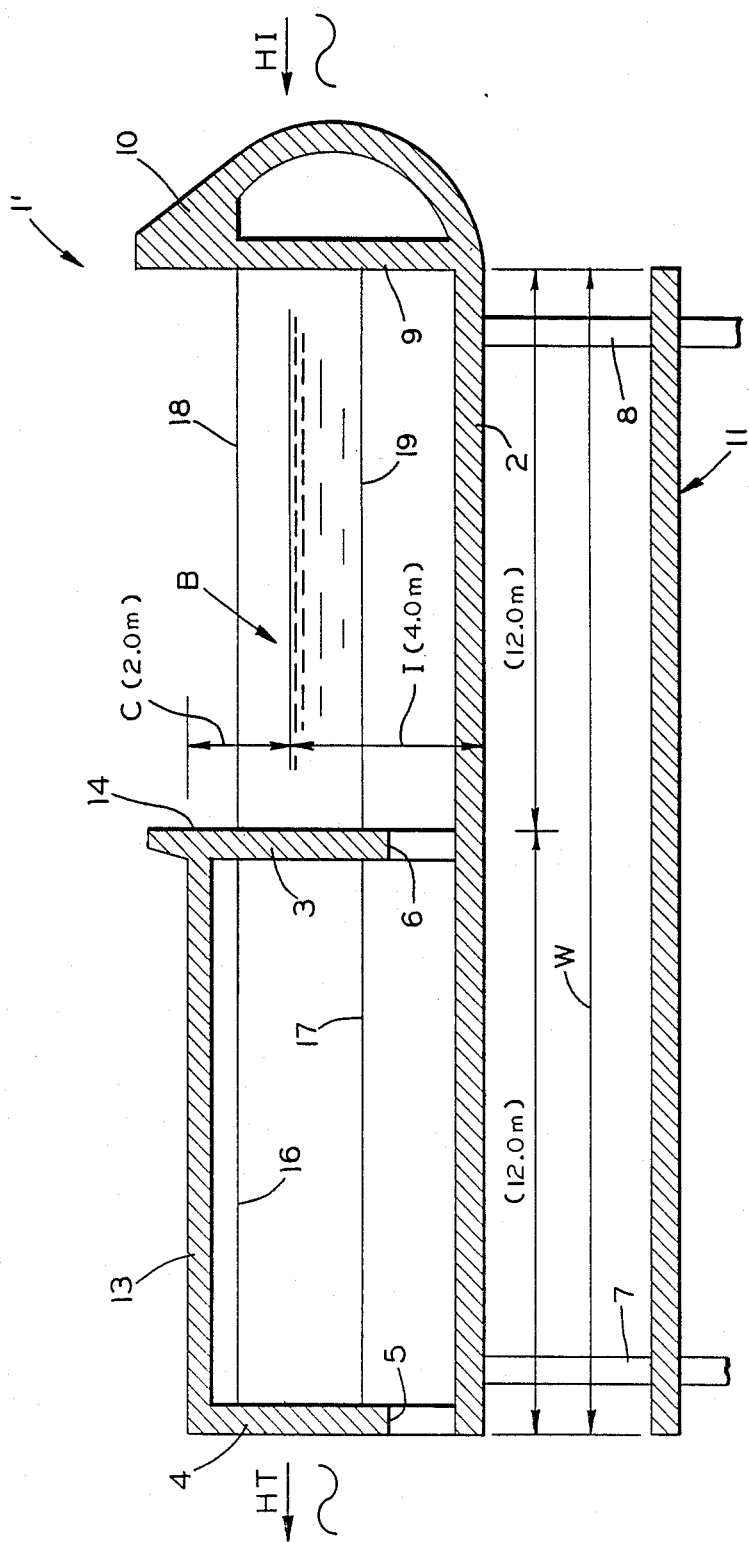
FIG. 8 is a side elevational view of a breakwater according to a first alternate embodiment of the present invention in cross-section.
Figure 9:
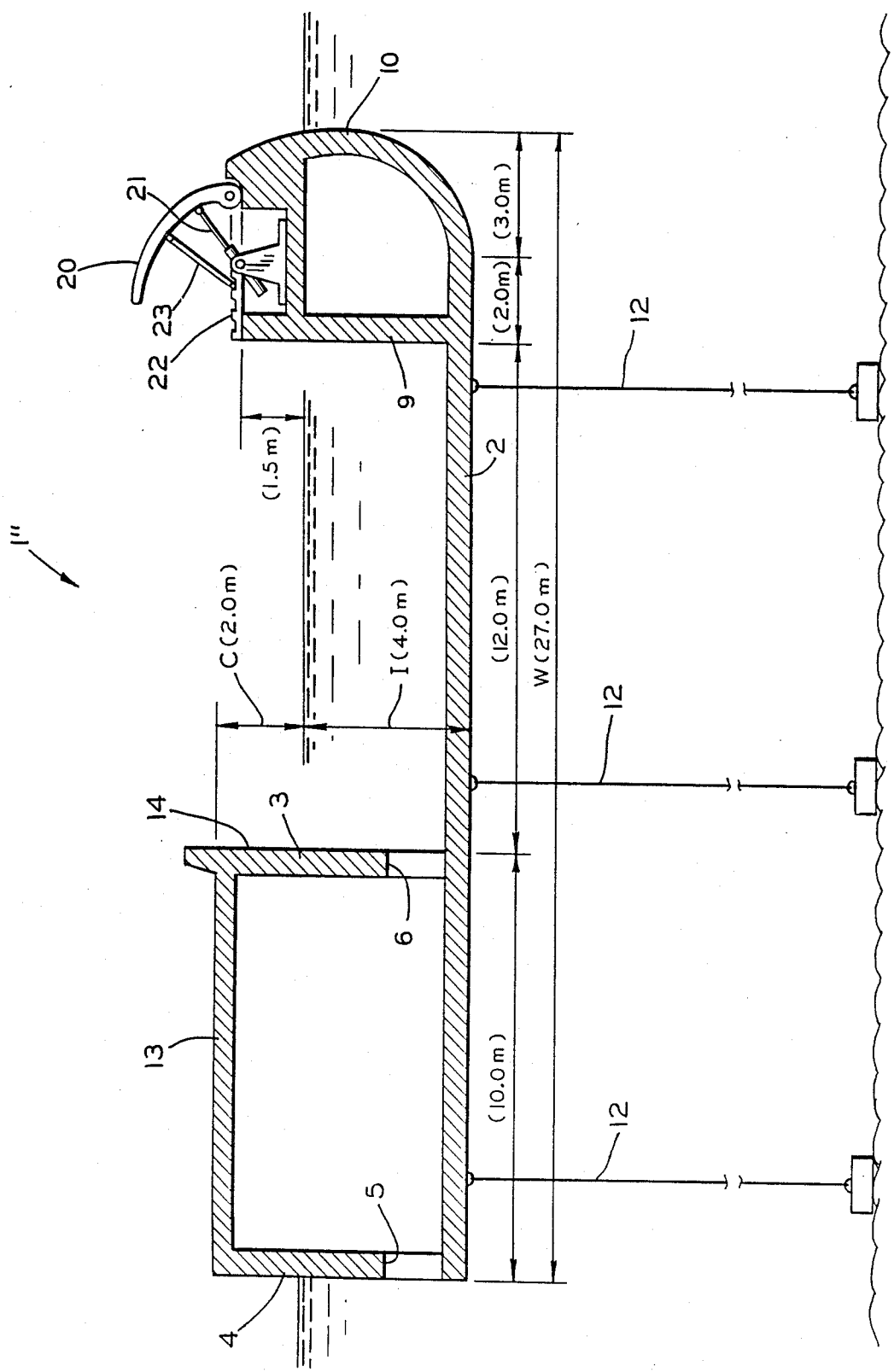
FIG. 9 is a side elevational view of a breakwater according to a second alternate embodiment of the present invention in cross-section.

By way of illustration of embodiment of the method according to the invention, FIGS. 7, 8 and 9 give hereinafter three sections of breakwaters, the first adapted to weak swells, only exceptionally exceeding a period of 6 seconds and an amplitude of 3 meters, the second to greater swells, the third to strong swells or less considerable swells in a tidal site.

The first (FIG. 7) is constituted by a simple rectangular caisson 1 of which the bottom 2 is full, but of which the upper face 13 has been removed to form an opening 14 within which the ties 15 extend between the front wall 9 and the intermediate wall 3, on the wide side part. The intermediate partition 3 and the rear wall 4 are pierced at 5 and 6 preferably by regularly spaced orifices. The structure may be metallic or concrete possibly with wooden grating. Its dimensions are indicated.

The caisson may rest on piles. Docking on stretched cables may be envisaged such as cables 12 shown in FIG. 9. The caisson 1 of FIG. 7 is supported by a piling 7 adjacent the rear wall 4 and by a piling 8 adjacent the solid front wall 9. Of course, any suitable number of piles can be utilized. The width W is 12.0 m, with a dimension of 7.0 m from the front wall 9 to the intermediate wall 3 defining the energy dissipation basin B and a dimension of 5.0 m from the intermediate wall 3 to the rear wall 4. The depth of immersion I is 2.0 m and the projection C is 1.0 m. The incident swells HI and the transmitted swells HT travel in the direction of the associated arrows.

With such a caisson, the coefficient of transmission would be less than 0.10 for swells less than or equal to 4 seconds, about 0.20 for swells of 5 seconds and would attain 0.50 for swells of 6.3 seconds.

The second (FIG. 8) well adapted to swells going up to 7 seconds and exceptionally able to attain 10 seconds and 10 m amplitude, has a profile comparable to that forming the subject matter of the tests reported hereinabove. Its dimensions are indicated. It comprises a bulb 10 at the front. Ties 16 and 17 extend between the walls 3 and 4 and ties 18 and 19 extend between the walls 3 and 9. These ties can be individual rods or beams, or can represent the upper and lower edges of generally vertically extending planar structures.

The structure may be metallic or of concrete.

The caisson 1' or FIG. 8 may rest on vertical and oblique piles, or vertical columns of sufficient diameter or piles.

The yield may be increased, beyond 7 seconds, and as a function of the swells observed and the results desired, by increasing the width or the penetration or by disposing, below the caisson, a second plate 11 of the same width.

The third caisson 1" (FIG. 9) has for essential characteristic the fact of having an adjustable upstream threshold height.

This particularity is interesting particularly in the case of works located on a tidal site or when it is desired to adapt as closely as possible to the prevailing swell the height of the level dimension of the upstream threshold, with a view in particular to limiting the horizontal efforts or simply with a view to best protecting the aesthetics of the site.

This device further presents the advantage of being able to lower the level dimension of the threshold as desired and thus to spread an exceptional swell without the horizontal efforts generated in the structure being prohibitive.

The Figure shows that the adjustment of the level dimension of the upstream threshold may be obtained, in particular, by employing a mobile shutter 20 similar to those encountered in shutter or lever weirs. The adjustment of the shutter may, for example, be obtained with the aid of a hydraulic jack 21 or a compressed air volume. The different positions of stability being fixed by the different notches of a horizontal rack 22 on which a diagonal rod 23 abuts.

Of course, these embodiments are given solely by way of non-limiting examples and numerous other variants thereof may be designed.

For example, the downstream edge of the caisson may be made level with a dimension of the order of 1.50 m to 2.00 meters or more and sufficiently widened to constitute a dockable quay to receive ships in water calmed by the device.

Similarly, the weakly immersed fixed plate may be surmounted only by a weakly emerging upstream edge so that only this upstream edge is visible above the free surface of the sea.

Finally, the fixed nature of the weakly immersed plate may be obtained by a foundation of said plate on piles or by fixation of the structure on stretched cables after the latter has been given positive floatability.

According to a more sophisticated embodiment of the invention, the performances obtained may be further improved by the addition of a second plate some meters beneath the first.

We claim:

1. A method for attenuating sea-swell effects to protect maritime sites, harbors, maritime works, or coastal or off-shore plants, comprising:
    a. providing a generally horizontally extending caisson having a bottom plate with an upstream edge and a downstream edge spaced apart a predetermined distance, a solid front wall extending upwardly from said upstream edge, and a rear wall extending upwardly from said downstream edge;
    b. immersing said caisson in a body of water with an upper end of said front wall projecting above an upper surface of the body of water and said bottom plate spaced from a bottom surface of the body of water; and
    c. providing means for supporting said caisson in a selected location in said body of water, said upstream edge facing incident swells whereby a fixed wall of water is formed beneath said bottom plate capable of horizontal movements only and above which the incident sea wave can not normally propagate freely, the fixed wall of water behaving like an inert obstacle to at least partially reflect an incident swell wave thereby substantially reducing the amplitude of a swell wave transmitted past said caisson.

2. A method according to claim 1 wherein said step a. includes forming at least one orifice in said rear wall.

3. The method according to claim 1 wherein said step a. includes forming an intermediate wall extending upwardly from said bottom plate between said front wall and said rear wall, said front wall and said intermediate wall defining an energy dissipation basin.

4. The method according to claim 3 wherein said step a. includes forming at least one orifice in said rear wall and said intermediate wall.

5. The method according to claim 1 wherein said step c. is performed by supporting said caisson on a plurality of piles extending to the bottom surface of the body of water.

6. The method according to claim 1 including a step of selectively adjusting the height of said front wall.

7. A device for attenuating sea swell effects in a body of water, comprising:
    a caisson having a generally horizontally extending bottom plate with an upstream edge and a downstream edge spaced apart a predetermined distance;
    a solid front wall extending upwardly from said upstream edge;
    a rear wall extending upwardly from said downstream edge; and
    means for supporting said bottom plate immersed in a body of water and spaced above a bottom surface of the body of water with an upper end of said front wall extending above an upper surface of the body of water and said upstream edge facing incident sea swell waves, said bottom plate and the bottom surface of the body of water forming therrbetween a fixed wall of water able to have only horizontal movements and above which the incident swells can not normally propagate freely whereby the wall of water behaves like an inert obstacle to at least partially reflect the incident swells and substantially reduce the amplitude of swell waves transmitted past said caisson.

8. The device according to claim 7 wherein said bottom plate, said front wall and said rear wall form an energy dissipation bsain for receiving incident swell waves which pass over said upper end of said front wall.

9. The device according to claim 7 wherein said front wall has bulb-shaped contour facing incident swell waves.

10. The device according to claim 7 including means for selectively adjusting the height of said upper edge of said front wall.

11. The device according to claim 7 wherein an upper end of said rear wall extends above the upper surface of the body of water.

12. The device according to claim 11 wherein said rear wall is adapted to be used as a dockable quay.

13. The device according to claim 7 wherein said predetermined distance between said upstream edge and said downstream edge is approximately one half of a minimum wave length of the incident swell waves to be attenuated.

14. The device according to claim 7 including at least one orifice formed in said rear wall.

15. The device according to claim 7 including an intermediate wall extending upwardly from said bottom plate and cooperating with said front wall to form an energy dissipation basin for receiving incident swell waves which pass over said upper end of said front wall.

16. The device according to claim 15 including at least one orifice formed in said rear wall and said intermediate wall.

17. The device according to claim 7 wherein said bottom plate is a first bottom plate and including a second generally horizontally extending bottom plate, said second bottom plate being spaced below said first bottom plate and supported by said means for supporting.

18. The device according to claim 7 wherein said means for supporting includes a plurality of piles extending between said bottom plate and the bottom surface of the body of water.

19. The device according to claim 7 wherein said means for supporting includes a plurality of cables each having one end attached to said caisson and an opposite end adapted to be fixed with respect to the location of said caisson in the body of water and wherein said caisson is buoyant.

* * * * *